United States Patent
Almási et al.

(10) Patent No.: US 9,548,584 B2
(45) Date of Patent: Jan. 17, 2017

(54) METHOD AND ARRANGEMENT TO GENERATE FEW OPTICAL CYCLE COHERENT ELECTROMAGNETIC RADIATION IN THE EUV-VUV DOMAIN

(71) Applicants: PÉCSI TUDOMÁNYEGYETEM, Pécs (HU); TÁMOGATOTT KUTATÓCSOPORTOK IRODÁJA, Budapest (HU)

(72) Inventors: Gábor Almási, Kozármisleny (HU); János Hebling, Pécs (HU); Mátyás Mechler, Siófok (HU); György Tóth, Kásád (HU); Zoltán Tibai, Kajdacs (HU)

(73) Assignees: University of Pécs, Pécs (HU); Magyar Tudományos Akadémia Támogatott Kutatócsoportok, Budapest (HU)

( * ) Notice: Subject to any disclaimer, the term of this patent is extended or adjusted under 35 U.S.C. 154(b) by 0 days.

(21) Appl. No.: 14/773,006

(22) PCT Filed: Mar. 5, 2014

(86) PCT No.: PCT/HU2014/000023
§ 371 (c)(1),
(2) Date: Sep. 4, 2015

(87) PCT Pub. No.: WO2014/135907
PCT Pub. Date: Sep. 12, 2014

(65) Prior Publication Data
US 2016/0020574 A1 Jan. 21, 2016

Related U.S. Application Data

(60) Provisional application No. 61/772,663, filed on Mar. 5, 2013.

(30) Foreign Application Priority Data

Mar. 5, 2013 (HU) .......................... 1300137

(51) Int. Cl.
H01S 3/09 (2006.01)
H01S 3/0959 (2006.01)
(Continued)

(52) U.S. Cl.
CPC ............ H01S 3/0959 (2013.01); H01S 3/00 (2013.01); H01S 3/0903 (2013.01); H05H 7/04 (2013.01); H05H 2007/041 (2013.01)

(58) Field of Classification Search
CPC ......... H01S 3/0959; H01S 3/0903; H01S 3/00
(Continued)

(56) References Cited

U.S. PATENT DOCUMENTS

| 5,010,555 A * | 4/1991 | Madey ................. H01S 3/0903 372/100 |
| 9,053,833 B2 * | 6/2015 | Plettner .................... G21K 5/04 |
| 2009/0059969 A1 * | 3/2009 | Huang ................. H01S 3/0903 372/18 |

FOREIGN PATENT DOCUMENTS

| HU | 1100452 A2 | 2/2013 |
| WO | 2013024316 A2 | 2/2013 |

OTHER PUBLICATIONS

G. L. Carr et al., "High-power terahertz radiation from relativistic electrons" [Nature 420, pp. 153-156 (Nov. 14, 2002)]; 4 pages.
(Continued)

Primary Examiner — Kinam Park
(74) Attorney, Agent, or Firm — Fitch, Even, Tabin & Flannery LLP

(57) ABSTRACT

The present invention relates to a method and an arrangement to generate a coherent electromagnetic radiation con-
(Continued)

Figure 1:
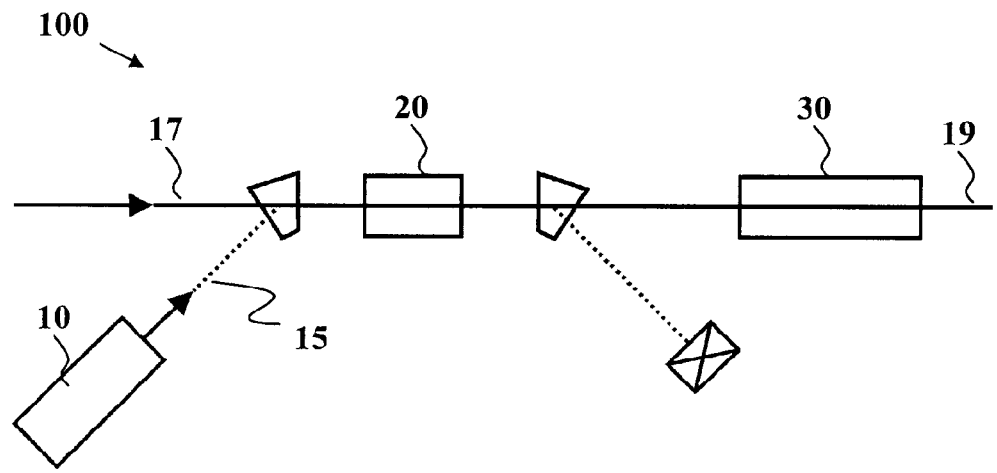

taining at most a few optical cycles in the extreme ultraviolet/vacuum ultraviolet domain. The inventive method comprises the steps of providing an electron package (15) of relativistic velocity; modulating said electron package (15) with high intensity laser light (17) in an undulator (20) having an undulator period smaller than the undulator period ($\lambda$u) satisfying the resonance condition, producing thereby an electron package formed of electron microbunches; and passing the electron package (15) of electron microbunches leaving said undulator (20) through a static magnetic field, and generating thereby a coherent electromagnetic radiation, wherein said static magnetic field is generated in conformity with the coherent electromagnetic radiation to be achieved. The arrangement comprises means for providing an electron package (15) of relativistic velocity; means for providing high-intensity laser light (17); a first undulator (20) arranged in the propagation direction of the electron package (15) of relativistic velocity, said first undulator being adapted to receive the electron package (16) and the laser light (17) simultaneously and to induce an interaction thereof, said interaction resulting in the microbunching of the electron package (15), wherein the undulator period of said first undulator (20) being smaller than the undulator period ($\lambda$u) satisfying the resonance condition; and a second undulator (3) arranged in the propagation direction of the electron package (15) after said first undulator (20), said second undulator (30) generating a magnetic field in conformity with the coherent electromagnetic radiation to be generated.

12 Claims, 3 Drawing Sheets

(51) Int. Cl.
*H01S 3/00* (2006.01)
*H05H 7/04* (2006.01)

(58) Field of Classification Search
USPC .................................................. 372/73, 5, 2
See application file for complete search history.

(56) References Cited

OTHER PUBLICATIONS

Y. Shen et al., "Tunable Few-Cycle and Multicycle Coherent Terahertz Radiation from Relativistic Electrons" [Phys. Rev. Lett. 107, 204801 (2011)] 5 pages.
K. Honkavaara et al., "Status of the FLASH II Project" [34th International Free Electron Lasers Conference, Kyoto 2012, WEPD07]; 4 pages.
A. Azima et al., "Experimental Layout of 30 nm Harmonic Laser Seeding at FLASH" [Jun. 27, 2008, retrieved from the Internet: URL:http://accelconf.web.cern.ch/AccelConf/e08/papers/mopc028.pdf ]; 3 pages.
S. Khan., "Femtoslicing in Storage Rings" [Particle Accelerator Conference, 2005, PAC 2005, Proceedings of The Knoxville, TN, USA May 16-20, 2005, IEEE, Piscataway, NJ, USA]; 5 pages.
Z. Tibai, et al., "Proposal for sub-femtosecond pulse generation with controlled carrier-envelope phase" [2013 Conference on Lasers & Electro-Optics Europe & International Quantum Electronics Conference Cleo Europe/IQEC, IEEE, May 12, 2013]; 1 page.
A. Zholents., "Next-Generation X-Ray Free-Electron Lasers" [IEEE Journal of Se-lected Topics in Quantum Electronics, IEEE Service Center, Piscataway, NJ, US, vol. 18, No. 1, Jan. 1, 2012, pp. 248-257]; 10 pages.
J. Yang., "Experimental studies of transverse and longitudinal beam dynamics in photoinjector" [Japanese Journal of Applied Physics, vol. 44, issue 12, pp. 8702-8707. (2005)]; 7 pages.
Hungarian Search Report dated Jan. 10, 2014; P1300137; 2 pages.
International Preliminary Report on Patentability, PCT/HU2014/000023, dated Sep. 8, 2015; 8 pages.
Communication concerning correction of deficiencies in written opinion/amendment of application/payment of claims fee dated Oct. 23, 2015; HU 14745229.6-1556; 2 pages.
Almási, G., et al; Presentation dated Feb. 2, 2012; 38 pages.

\* cited by examiner

METHOD AND ARRANGEMENT TO GENERATE FEW OPTICAL CYCLE COHERENT ELECTROMAGNETIC RADIATION IN THE EUV-VUV DOMAIN

CROSS-REFERENCE TO RELATED APPLICATIONS

This application is the National Stage of International Application No. PCT/HU2014/000023, filed Mar. 5, 2014, which claims the benefit of both U.S. Provisional Patent Application No. 61/772,663 filed Mar. 5, 2013, and Hungarian Patent Application No. P1300137 filed Mar. 5, 2013.

The present invention relates to a method and an arrangement to generate a coherent electromagnetic radiation in the extreme ultraviolet (EUV; soft X-ray) and vacuum ultraviolet (VUV) domains, in particular laser pulses comprising a half, a single one, or a few (i.e. at most several, preferably at most five) optical cycles. A train of pulses generated by the method or the arrangement has a stable carrier-envelope phase (i.e. the carrier-envelope phase is the same from pulse to pulse).

Studying the fastest processes occurring in nature can be carried out by ultrafast electromagnetic pulses (e.g. laser pulses). The shortest achievable pulse length of pulses in a given spectral range is equal to the reciprocal of the average frequency. A pulse with a length of the reciprocal of the average frequency comprises only a single (optical) oscillation, and thus it is called single-cycle pulse. Generation of such pulses by electrical means have long been known in the microwave and radio frequency ranges with frequencies thousands times smaller than that of visible light. With frequencies about a hundred times smaller than the frequency of visible light, i.e. in the range of the so-called terahertz (THz) domain, generation of such pulses by means of laser pulses is possible for about two decades. In case of laser sources operating in the range of visible light, generation of nearly single-cycle pulses (regarding the intensity profile) has become possible only in the last few years.

Laser pulses which are quite short in time (e.g. at most of a picosecond (ps) length) usually comprise multiple frequency components and therefore can be considered as wave packages. The carrier-envelope phase (CEP) of such an electromagnetic pulse is the phase by which the carrier wave precedes the maximum of the envelope, which actually describes the temporal shape (distribution) of the electric field. In a train of such pulses generated by a given laser source, the CEP usually changes from pulse to pulse, which is disadvantageous. Therefore, it is a requisite for a train of pulses to be usable that the CEP is kept at a constant value. The temporal distribution of the electric field in said few-cycle pulses can be controlled only to a limited extent; thus their CEP can be kept constant only to a limited extent as well.

The paper by A G. L. Carr, M. C. Martin, W. R. McKinney, K. Jordan, G. R. Neil and G. P. Williams published in Nature under the title "*High-power terahertz radiation from relativistic electrons*" [Nature 420, pages 153-156 (14 Nov. 2002)] discloses the generation of a high-powered wideband THz radiation by exploiting electron bunches of sub-ps length in an accelerator. The scientific publication by Y. Shen, X. Yang, G. L. Carr, Y. Hidaka, J. B. Murphy and X. Wang published in Physical Review Letters under the title "*Tunable Few-Cycle and Multicycle Coherent Terahertz Radiation from Relativistic Electrons*" [Phys. Rev. Lett. 107, 204801 (2011)] discusses the generation of narrowband few-cycle coherent THz pulses with tunable frequency by means of a temporally modulated relativistic electron beam. The waveform of THz pulses generated in this way can be arbitrarily varied between certain limits by temporally shaping the electron beam.

The aforementioned prior art solutions are suitable for generating few-cycle pulses in the THz frequency range. However, they do not provide a solution for generation of electromagnetic pulses, in particular laser pulses, over the THz frequency range, i.e. in the EUV and VUV ranges (in practice, between several tens of nanometers and at most about 190 nm).

The shortest pulses generated to date are the attosecond (as) length ultrashort pulses. The average frequencies thereof are a few hundred times larger than the frequency of visible light and fall practically in the EUV and VUV ranges. Such pulses are generated from ultrashort laser pulses by the so-called high harmonic generation. The shortest as pulses acquired in this way comprise only a few optical cycles (oscillations), but controllability of the exact number of oscillations and especially of the phase (i.e. of the carrier-envelope phase) is insufficient.

Consequently, the object of the present invention is to provide a method and an arrangement that facilitate the generation of ultrashort pulses in the EUV and VUV ranges comprising at most several, preferably a few, more preferably a single optical cycle, whose carrier-envelope phase can be kept constant (i.e. is well controllable).

In our studies, it has been found that when passing a relativistic electron package through an undulator with a spatially alternating magnetic field and bringing it into interaction with an intense laser light introduced simultaneously into said undulator by means of exploiting the inverse free-electron laser (IFEL) effect, a microbunching characterized by a duty cycle that is significantly lower than that/those of the microbunching achievable nowadays in electron packages can be achieved if modulation of the electron package is performed by applying an undulator with an undulator period that is smaller than the undulator period satisfying the resonance condition known from prior art and by a laser having the power of a few terawatts (TW). Here, and from now on the term "duty cycle" refers to the ratio of the width of the microbunches to the distance of the microbunches within said electron package.

Thus, in light of the aforementioned, the object of the present invention is achieved in one aspect of the invention by elaborating a method in accordance with claim 1. Preferred embodiments of the method according to the invention are set forth in claims 2 to 6. In a further aspect, the object of the present invention is achieved by providing an arrangement according to claim 7. Preferred embodiments of said arrangement are defined by claims 8 to 11.

The undulator used for microbunching the electrons in the solutions according to the invention comprises only a few, preferably at most five, most preferably only one undulator period, i.e. it is preferably a single-period undulator. As a result of this (i) the IFEL interaction ensures via the laser field transmitted through the microbunching undulator simultaneously with the electron package that the temporal extension of the microbunches will be significantly smaller than the temporal extension of the microbunches arising in traditional multi-period undulators, that is, the duty cycle at a given spatial position (preferably, at the position of a so-called radiator undulator applied to generate the coherent radiation) is significantly smaller than the duty cycles that are characteristic of the conventionally applied arrangements—the short wavelength radiation generation is made available by the electron bunches of small spatial extension; and (ii) according to our experiences, an optimal extent of microbunching can be achieved if—in a microbunching undulator—an undulator parameter, which is proportional to the magnetic field strength, of smaller values than what are usually applied is combined with higher electric field strengths of the transmitted laser light effecting the IFEL interaction.

Figure 2A:
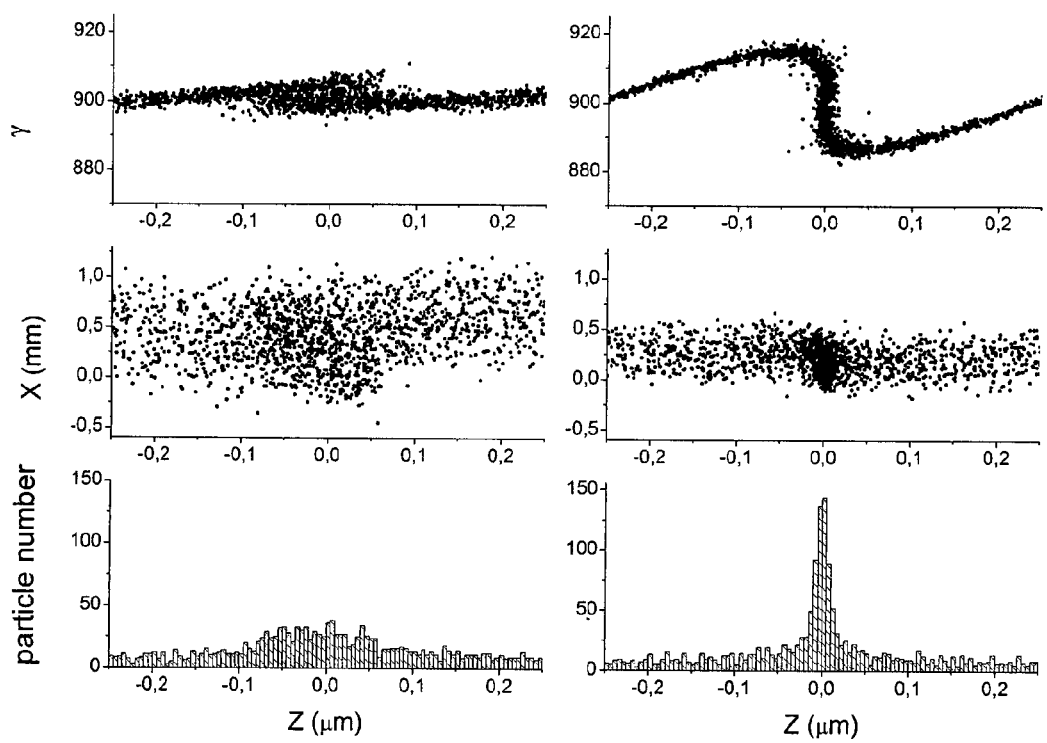
Figure 2B:
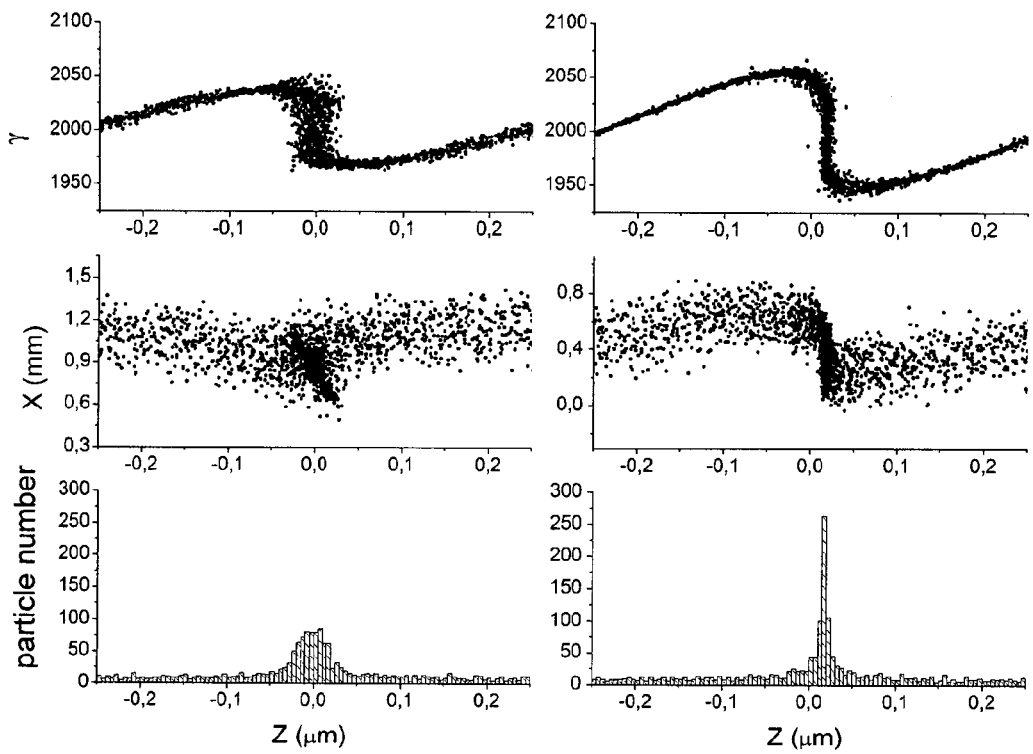
Figure 3A:
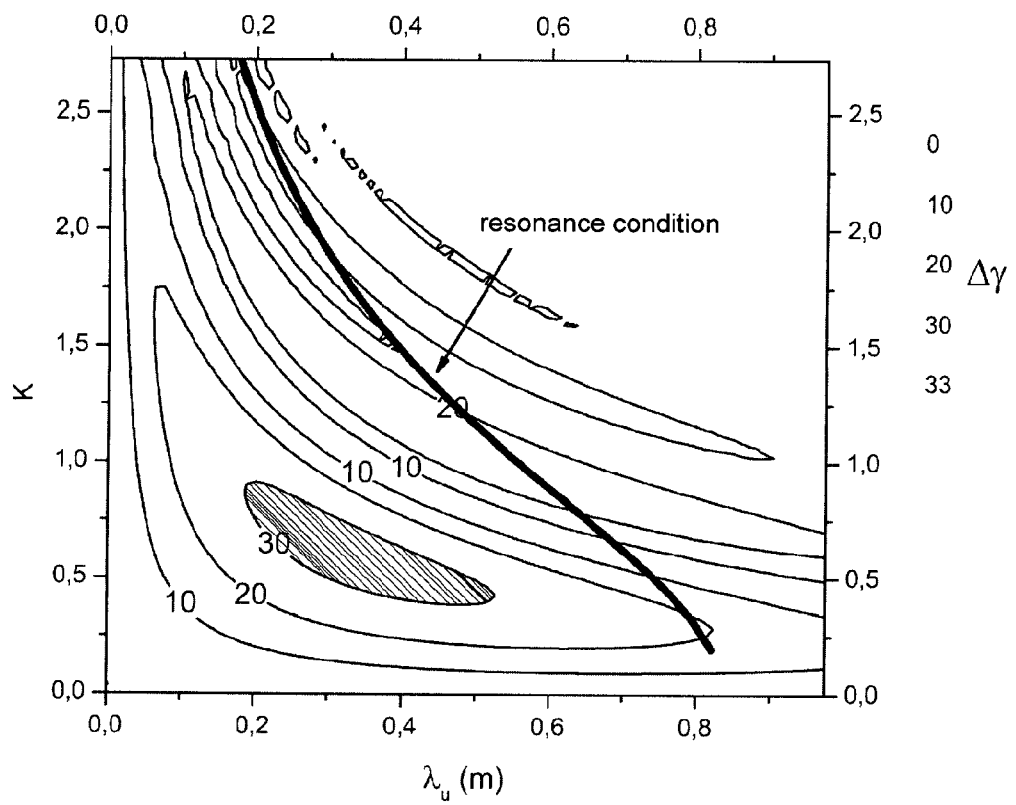
Figure 3B:
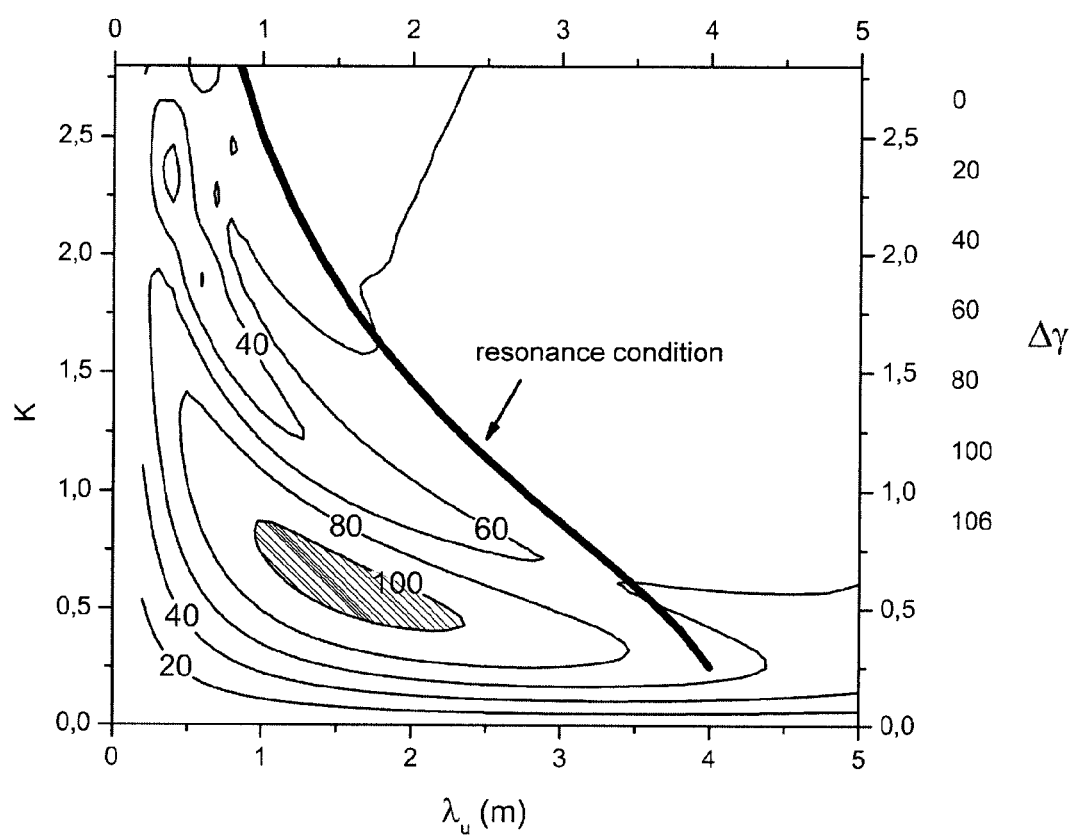

In what follows, the invention is described in detail with reference to the accompanying drawings, wherein FIG. 1 is a schematic drawing of the arrangement according to the invention;

FIGS. 2A and 2B illustrate simulation results obtained for an electron beam transmitted through the microbunching undulator and subjected to microbunching via the IFEL interaction, wherein the drawings on the left side refer to an arrangement comprising a microbunching undulator with an undulator period satisfying the resonance condition known from the prior art, while the drawings on the right side refer to an arrangement comprising a microbunching undulator according to the present invention, with preferably a single undulator period; and FIGS. 3A and 3B show the electron energy modulation ($\Delta\gamma$) induced by the microbunching (i.e. the electron package modulating) undulator via the IFEL interaction as a function of the undulator parameter K and the undulator period $\lambda_u$ for two different electron sources (with parameters summarized in table 1).

FIG. 1 illustrates schematically a preferred exemplary embodiment of an arrangement 100 according to the invention. Here, a first (or microbunching) undulator 20 is arranged in the propagation path of an electron package 15 (characterized preferably by a relativistic factor of $\gamma=100\div3000$) provided by a relativistic electron source 10, preferably a microwave electron accelerator or a laser plasma electron accelerator or a linear accelerator (linac), wherein after this in the propagation direction of said electron package 15 a second (or radiator) undulator 30 is disposed. The undulators 20, 30 are traditional magnetic undulators that influence the electrons of the electron package 15 transmitted therethrough by their magnetic fields, the orientation of which alternates along the propagation direction of the electrons. The arrangement 100 further comprises a laser source of suitable power (preferably 3 to 12 TW, more preferably about 10 TW; not shown in the drawings) that provides laser light 17 inducing microbunching of the electrons in the electron package 15 by means of an interaction based on the IFEL principle. As it is obvious to a person skilled in the art, to direct the electron package 15 and/or the interacting laser light 17 (for e.g. monitoring/analytical purposes) into the desired direction(s), further beam guiding elements of known type/structure/properties can also be arranged in the propagation path of said electron package 15.

The core feature of the undulator 20 used in the arrangement 100 according to the invention is that its period length does not satisfy a period length $\lambda_u$ according to the resonance condition known from the prior art and given by the formula of $$\lambda_u = \frac{2\gamma^2 \cdot \lambda_l}{1 + K^2/2},$$

wherein $\gamma$ is the relativistic factor, $\lambda_l$ is the wavelength of laser light providing the IFEL effect and K is the undulator parameter. In particular, the period length of the undulator 20 used in the arrangement 100 according to the invention is chosen so as to be significantly shorter than the period length $\lambda_u$ defined by the above resonance condition and used in the prior art; in this case the microbunching undulator 20 applied in the arrangement 100 comprises at most a few, preferably only one undulator period, therefore its magnetic field reverses only once along the propagation direction of the electron package 15. This latter embodiment corresponds to a highly preferred embodiment of the undulator 20.

To minimize the duty cycle characterizing the microbunching, it is a requirement that the energy modulation in the IFEL interaction of the electron package 15 in the undulator 20 is maximal. In order to test this, the energy modulation of an electron package entering the undulator at right angle has been numerically calculated as a function of the undulator parameter K and the undulator period length $\lambda_u$. Performing the numerical calculations with the parameters of an electron package as is presented for example in the paper by J. Yang entitled to "*Experimental studies of transverse and longitudinal beam dynamics in photoinjector*" [Japanese Journal of Applied Physics, vol. 44., issue 12., pages 8702-8707. (2005)] (see the values indicated in column (a) of Table 1) and then illustrating the numerical results graphically, the contour line plot of FIG. 3A is obtained. It can be seen from the figure, that a maximal energy modulation ($\Delta\gamma$) is achieved at an undulator length less than the resonance condition: the maximum ($\Delta\gamma=33$) belongs to the undulator parameter of K=0.55 and the undulator period of $\lambda_u=0.36$ m, while in case of the undulator parameter of K=0.55 and an undulator period satisfying the resonance condition according to the above formula (i.e. at $\lambda_u=0.73$ m), the achieved energy modulation is only $\Delta\gamma=6$. Repeating the numerical calculations for the parameters of an electron package generated by the DESY FLASH free electron laser operating in Germany (see the values indicated in column (b) of Table 1), the results shown in FIG. 3B have been obtained. Here, the value of maximal energy modulation is $\Delta\gamma=106$ that can be achieved for an undulator period of $\lambda_u=1.6$ m. On the contrary, if an undulator satisfying the resonance condition is used with an undulator period larger, i.e. $\lambda_u=3.59$ m, than the optimal one, an energy modulation of merely $\Delta\gamma=60$ can be achieved. Again, for the whole calculation, the value of the undulator parameter was K=0.55. Consequently, the maximal energy modulation can be achieved if the undulator period $\lambda_u$ and the undulator parameter K, as matching pair values, are chosen from the area marked by hatching in FIGS. 3A and 3B, with an undulator period length not satisfying the resonance condition.

The undulator 30 used in the arrangement 100 according to the invention comprises preferably also only a few undulator periods or even a single undulator period. The number of periods of the undulator 30 is determined by the desired number of optical cycles of the coherent radiation to be generated: the number of periods used in the undulator 30 correlates with the desired number of optical cycles. The exact shape of the electromagnetic radiation (in particular of the laser pulses generated) is determined by the form of the magnetic field present in the undulator 30 along the propagation direction of the electron package. Thus, both the width and the shape of the envelope, as well as the carrier-envelope phase (CEP) of the generated pulses can be manipulated, in particular, fixed/stabilized as desired by adjusting the magnetic field (in a previously set manner).

Generation of coherent electromagnetic pulses in the EUV and VUV domains with the arrangement 100 according to the invention is performed as follows.

An electron package of suitable energy (characterized by the relativistic factor of $\gamma=100\div3000$) generated by said relativistic electron source 10, optionally after being appropriately oriented/directed, is passed through the alternating magnetic field of the microbunching undulator 20. After properly aiming the intense laser light 17 generated by the laser source, it is introduced into the undulator 20 simultaneously with the electron package 15. Thus, by exploiting the IFEL effect known from prior art, an energy modulation of the electrons in the electron package 15 is induced with a period equal to the wavelength $\lambda_l$ of the laser light 17. Over a sufficient distance of flight (such as e.g. 3.8 m and 12 m if the parameters indicated in columns (a) and (b) of Table 1, respectively, is used), the energy modulation effected in this way results in a spatial electron density modulation within the electron package 15. Consequently, microbunching occurs in the electron package 15, i.e. rather thin electrons layers (that is, 18 to 20 nm and 8 to 10 nm in thickness for the parameters given in columns (a) and (b) of Table 1, respectively) are created in the propagating electron package 15 that propagate at a given distance apart from one another. The extension of the thus created electron microbunches along the propagation direction is a fraction of the wavelength $\lambda_l$ of the laser light 17 applied to effect said microbunching, i.e. it is in the order of 10 nm. The electron package 15 leaving the undulator 20 while its microbunching evolves in time is then fed into a coherent radiator undulator 30 at the spatial position where optimal microbunching arises (i.e. in that point of the propagation path of the electron package, where the longitudinal spatial extension of said microbunches is the smallest). Here, the electrons forced to transverse oscillations by the magnetic field of the undulator 30 emit coherently—and therefore intensively—an electromagnetic pulse 19 along their propagation direction, wherein said pulse 19 has got a shape in time that corresponds to the spatial distribution of the magnetic field of the radiator undulator 30. Then, the pulse 19 having a duration/length of as or fs due to the geometry of the arrangement 100 is directed to an arbitrary place of utilization and is used there as desired. The method disclosed herein allows an efficient generation of coherent pulses with frequencies about three orders of magnitude higher, i.e. with wavelengths about three orders of magnitude smaller than that of the coherent electromagnetic pulses generated by prior art techniques (see the aforementioned papers by G. L. Carr and Y. Shen).

The results of the numerical simulations we carried out and summarized in FIGS. 2A and 2B clearly demonstrate the practical applicability of the previously discussed arrangement 100. To carry out the simulation, the GPT ("General Particle Tracer") numerical code have been used which is known from the prior art (its details can be found e.g. on the webpage of http://www.pulsar.nl/qpt/) and widely used, with the parameters summarized in the following Table 1, assuming only one undulator period in the microbunching undulator 20 and using small values for the undulator parameter K; in particular, choosing K=0.55 for the following example. Column (a) contains the electron package parameters given in the earlier referenced publication of J. Yang, while column (b) contains the parameters used in combination with the DESY FLASH free electron laser located in Germany (for further details, see K. Honkavaara, "Status of the FLASH II Project", 34th International Free Electron Lasers Conference, Kyoto 2012, WEPD07).

TABLE 1

| parameter value | (a) | (b) |
|---|---|---|
| electron beam energy | 460 MeV | 1000 MeV |
| inherent energy deviation of the electron beam (1σ) | 0.04% | 0.05% |
| charge of electron beam (pulse total) | ≈5 nC | ≈0.25 nC |
| electron beam pulse length (1σ) | 540 μm | ≈30 μm |
| electron beam normalized emittance | 3.2 mm mrad | 1.4 mm mrad |
| electron beam radius | 80 μm | 80 μm |
| period length of the microbunching undulator ($\lambda_u$) | 73 cm/36 cm | 3.59 m/1.6 m |
| laser wavelength ($\lambda_l$) | 516 nm | 516 nm |
| laser polarization | linear | linear |
| laser power | 3.89 TW | 10 TW |
| laser beam dimension in the microbunching undulator | 0.72 mm | 0.72 mm |

In Table 2 below, we have summarized the (temporal) pulse lengths ($\Delta t$) and pulse energies ($E_{as}$) achievable by the arrangement 100 for different relativistic factors $\gamma$ according to the simulation. Here $\lambda_u$ and $B_U$ stand for the spatial period length and the magnetic field strength of the radiator undulator 30, respectively, while $\lambda_r$ is the wavelength of pulses comprising a few optical cycles only generated in the radiator undulator 30.

TABLE 2

| Electron source | γ | $\lambda_u$ (cm) | $B_U$ (mT) | $\lambda_r$ (nm) | Δt (as) | $E_{as}$ (nJ) |
|---|---|---|---|---|---|---|
| (a) | 900 | 3.9 | 200 | 34 | 95 | 3.5 |
| (b) | 2000 | 42.7 | 12.5 | 60 | 225 | 25 |
| | 2000 | 2.1 | 25.1 | 30 | 100 | 7.5 |
| | 2000 | 14.2 | 37.7 | 20 | 80 | 4 |
| | 1000 | 10.7 | 50.3 | 60 | 225 | 5 |
| | 1000 | 5.3 | 100 | 30 | 115 | 2 |

FIGS. 2A and 2B shows graphically the simulation results obtained for an arrangement comprising a microbunching undulator with an undulator length satisfying the aforementioned resonance condition known from prior art (left side plots) and a microbunching undulator made with an undulator period according to the invention (prepared, in particular, as a single-period undulator; see the right side plots). FIGS. 2A and 2B show, from top to bottom, the distribution of relativistic factor γ along the propagation (i.e. longitudinal) direction of the electron package (i.e. the velocity distribution of electrons in the electron package), the distribution of electrons in the electron package in a plane containing the propagation direction, and the particle number distribution of the electron package along the propagation direction (i.e. the longitudinal extension of the electron layers generated by microbunching). Said figures are snapshots of the electron package traveling along the propagation direction; the snapshots have been taken in that moment of the simulation, when the electron package of microbunched structure (i.e. the electron package comprising or made up of microbunches of electrons) just passes at the middle of the radiator undulator, i.e. when its longitudinal thickness is the smallest. The figures clearly show that a more advantageous microbunching effect (spatial distribution of the electrons is narrower) can be achieved for an undulator period not satisfying the resonance condition than for an undulator period that satisfies it.

It is hereby noted that the simulation results for the microbunching undulator 20 having only one period discussed above in detail can also be verified theoretically. In light of the calculations performed, the optimal undulator period of said microbunching undulator is only about the half of the undulator period set forth by the resonance condition valid for the multiperiod undulators known in the prior art.

With the method and arrangement according to the invention such as (and fs) laser pulses can be generated (see Table 2), the oscillations of which are completely controlled both in number and in phase (i.e. CEP) due to the used geometrical arrangement. Moreover, the frequency of the oscillations can be changed in a wide range. A ground for the inherent stability of CEP is that the radiator undulator is a completely static device: the rather thin electron bunches are forced to radiate by the static (i.e. constant in time, but optionally spatially variable) magnetic field of the permanent magnets forming the undulator while the electrons are passing through said magnetic field. As the electrons reach the radiator undulator with a given energy and in packages of given longitudinal extension (width), there are no such factors present that could introduce uncertainties into the generated radiation and, thus, the CEP remains the same from pulse to pulse.

The present inventive solutions can be used highly advantageously when free electron lasers are to be constructed. By exploiting the solutions according to the invention, the costs of free electron lasers can be significantly reduced. Hence, their spreading and application on various fields (e.g. in medical sciences, material testing etc.) can significantly be improved. Furthermore, as the solutions according to the invention are suitable for obtaining pulse energies of several tens nJ, the CEP-stabilized pulses obtained thereby can be used as pump pulses in pump-probe measurements, thus making them applicable for measurements with a temporal resolution of as. Moreover, the as pulses with well-controllable carrier-envelope phase obtained by the solutions according to the present invention can also be used as input pulses for e.g. SASE FEL apparatuses.

It is obvious for a person skilled in the art that the aforementioned applications represent only some exemplary ways of application and do not limit the use of laser pulses generated by the solutions according to the invention in the extreme ultraviolet and vacuum ultraviolet domains and comprising at most a few, preferably only a single optical cycle.

The invention claimed is:

1. A method to generate a coherent electromagnetic radiation containing at most a few optical cycles in the extreme ultraviolet/vacuum ultraviolet (EUV-VUV) domain, comprising:
   providing an electron package (15) of relativistic velocity;
   modulating said electron package (15) with high intensity laser light (17) in an undulator (20) having an undulator period smaller than the undulator period ($\lambda_u$) satisfying the resonance condition, producing thereby an electron package formed of electron microbunches;
   passing the electron package (15) of electron microbunches leaving said undulator (20) through a static magnetic field, and generating thereby a coherent electromagnetic radiation, wherein said static magnetic field is generated in conformity with the coherent electromagnetic radiation to be achieved.

2. The method according to claim 1, wherein the undulator (20) having an undulator period smaller than the undulator period ($\lambda_k$) satisfying the resonance condition is provided in the form of a single-period undulator.

3. The method according to claim 1, wherein a number of magnetic periods of said static magnetic field is chosen in conformity with a desired number of optical cycles of the coherent electromagnetic radiation to be achieved.

4. The method according to claim 3, wherein said static magnetic field is provided in the form of a magnetic field comprising a single magnetic period.

5. The method according to claim 1, wherein the electron package's (15) relativistic factor ranges from about 100 to about 2000.

6. The method according to claim 1, wherein the electron package's (15) relativistic factor ranges from about 2000 to about 3000.

7. An apparatus to generate a coherent electromagnetic radiation containing at most a few optical cycles in the extreme ultraviolet/vacuum ultraviolet (EUV-VUV) domain, the apparatus comprising:
   means for providing an electron package (15) of relativistic velocity;
   means for providing high-intensity laser light (17);
   a first undulator (20) arranged in a propagation direction of the electron package (15) of relativistic velocity, said first undulator being adapted to receive the electron package (16) and the laser light (17) simultaneously and to induce an interaction thereof, said interaction resulting in microbunching of the electron package (15), wherein said first undulator's (20) undulator period being smaller than an undulator period ($\lambda_u$) satisfying the resonance condition;
   a second undulator (3) arranged in the propagation direction of the electron package (15) after said first undulator (20), said second undulator (30) configured to generate a magnetic field in conformity with coherent electromagnetic radiation to be generated.

8. The apparatus according to claim 7, wherein the undulator period of the first undulator (20) is smaller than $$\frac{2\gamma^2 \cdot \lambda_l}{1 + K^2/2}$$

wherein γ is a relativistic factor of the electron package (15) introduced into the first undulator (20), $\lambda_l$ is wavelength of the applied laser light (17) and K represents an undulator parameter.

9. The apparatus according to claim 8, wherein the first undulator (20) is a single-period undulator.

10. The apparatus according to claim 8, wherein the second undulator's (30) number of magnetic periods corresponds to a number of optical cycles of the coherent electromagnetic radiation to be achieved.

11. The apparatus according to claim 8, wherein energy of the electron package (15) of relativistic velocity ranges from about 50 MeV to about 1500 MeV, energy deviation of said electron package is at most 0.1%, and electric charge density of said electron package ranges from about 30 nC/cm$^3$ to about 90 nC/cm$^3$.

12. The method according to claim 2, wherein a number of magnetic periods of said static magnetic field is chosen in conformity with a desired number of optical cycles of the coherent electromagnetic radiation to be achieved.

* * * * *